United States Patent Office.

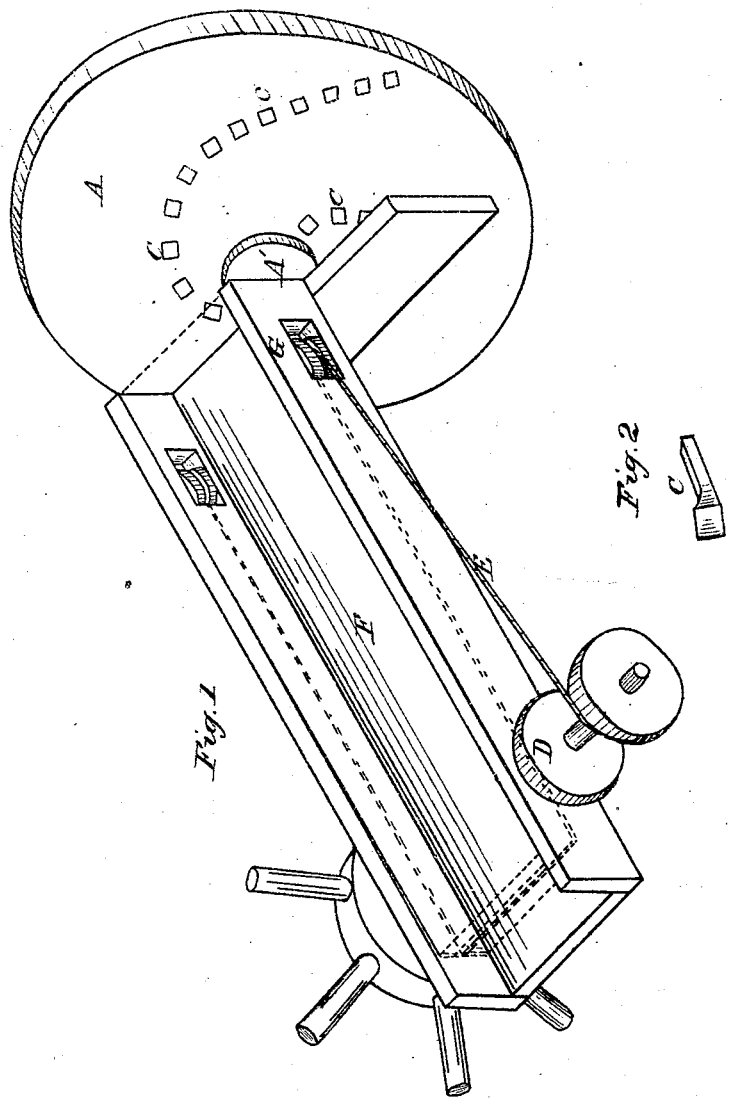

AMOR SMITH, OF CINCINNATI, OHIO.

Letters Patent No. 71,545, dated November 26, 1867.

---

IMPROVEMENT IN CUTTING-MACHINE FOR REDUCING CRACKLINGS, &c.

---

The Schedule referred to in these Letters Patent and making part of the same.

---

TO ALL WHOM IT MAY CONCERN:

Be it known that I, AMOR SMITH, of Cincinnati, in the county of Hamilton, and State of Ohio, have invented a new and useful Improvement in Crackling-Cutters for use in the preparation of cracklings before putting in the press; and I do hereby declare that the following is a full, clear, and exact description of the same, reference being had to the annexed drawings, making part of this specification, in which—

Figure 1 is a perspective view, and

Figure 2 is a view of the cutters.

The same letters in both figures indicate identical parts.

This invention is intended to relate to a machine designed for use in preparing cracklings for the press, according to the manner set forth in my former Letters Patent for that purpose.

A is a wheel caused to revolve across the open end of the box B. It has a series of holes through it, as shown, to receive the cutters C, which are shown in fig. 2, and are formed with a cutting-lip projecting in the direction of their revolution. The hub A holds the wheel at such a distance from the box, that the cutters will not come in contact with the end of the box. The cracklings are placed in the box or trough B. Around the axis D, ropes E pass, which are carried around pulleys G, (set in the side of the box near the wheel,) and attached to the head F, which, sliding in the box, is with the action of the windlass drawn towards the wheel, pressing the cracklings placed in the box in that direction.

What I claim as my invention, and desire to secure by Letters Patent, is—

The combination of the wheel A with cutters C, box B, and compressing-head F, substantially as and for the purpose set forth.

In testimony whereof, I have signed my name to this specification in the presence of two subscribing witnesses.

AMOR SMITH.

Witnesses:
  JOHN ELLIS,
  AMOR SMITH, Jr.